May 11, 1926.
C. E. BLACKBURN, SR., ET AL
1,584,006
AUTOMOBILE HEADLIGHT
Filed August 10, 1925
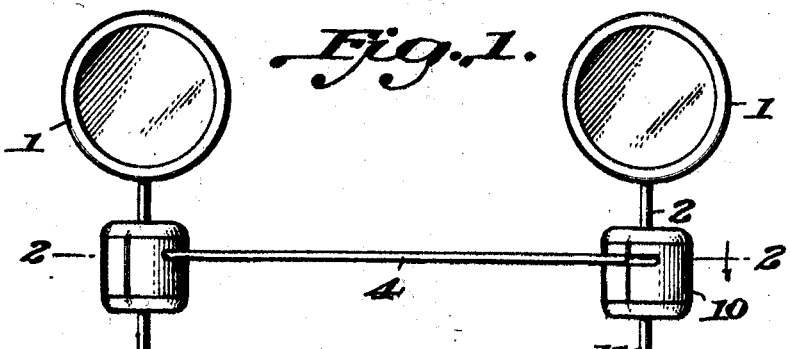
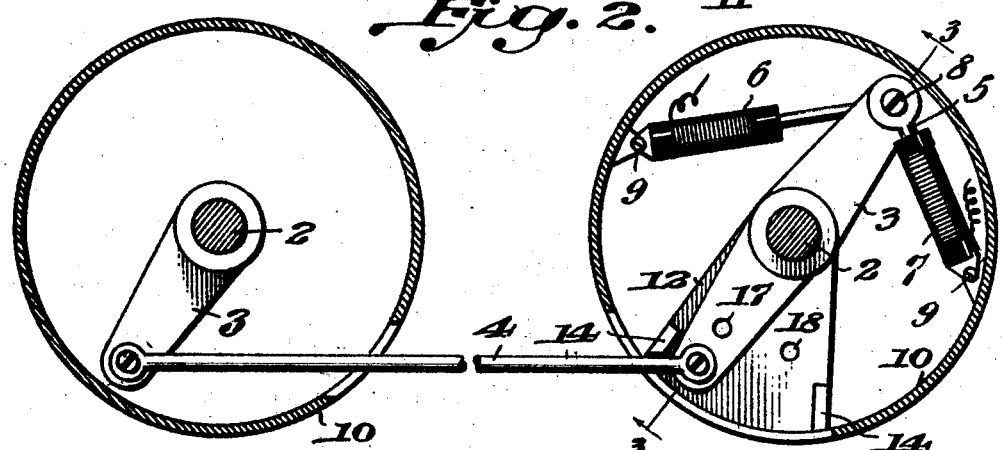
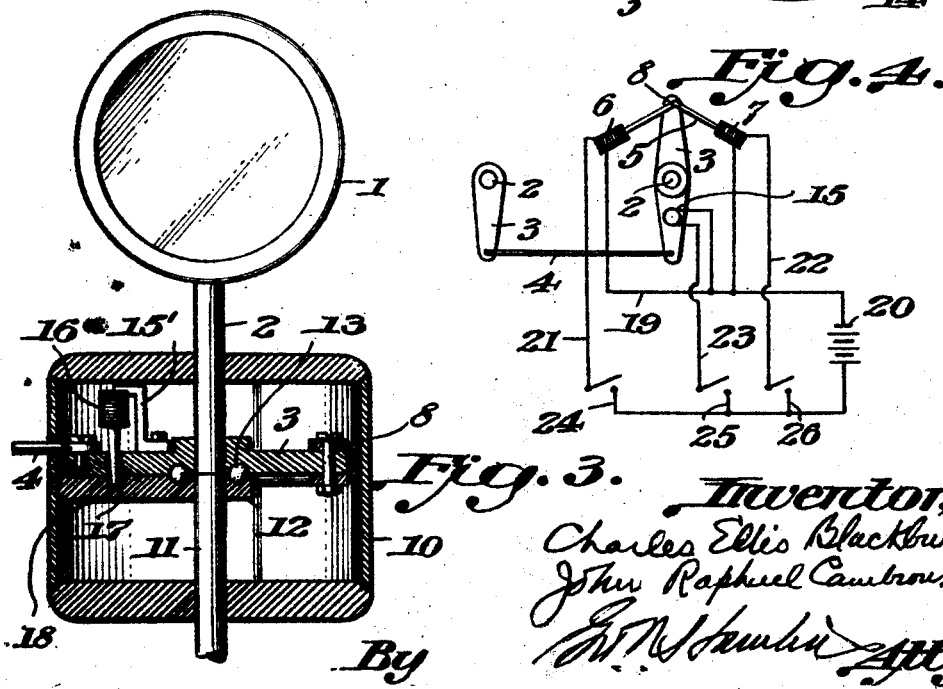
Inventor,
Charles Ellis Blackburn,
John Raphael Cambron, Sr.

Patented May 11, 1926.

1,584,006

UNITED STATES PATENT OFFICE.

CHARLES ELLIS BLACKBURN, SR., AND JOHN RAPHAEL CAMBRON, SR., OF EVANSVILLE, INDIANA.

AUTOMOBILE HEADLIGHT.

Application filed August 10, 1925. Serial No. 49,302.

Our invention relates to automobile headlights adapted to be electrically operated to turn them toward the right so that the rays of light will be deflected out of the line of vision of the driver of an automobile approaching from the opposite direction.

Our object is to provide headlights of this character employing novel electro-magnetic means for positively pulling or swinging the lights through a limited angle, say ten or fifteen degrees, toward the right of the street or road and for locking them in that position as long as necessary and, at the will of the driver, positively turning the headlights back to normal position and locking them there.

We are aware that it has been proposed heretofore to turn one or more headlights by electromagnetically operated means but we have provided novel means for that purpose and, in addition, a special electromagnetically operated locking device which is under the control of the driver and by which the headlights are locked in their normal, or their deflected, position.

The invention is susceptible of modification and the following description of an embodiment thereof is illustrative, and not restrictive, of the scope of the invention.

In the accompanying drawings,

Figure 1 is a front elevation of a pair of automobile headlights to which our invention is applied;

Fig. 2 is a section on the line 2—2, Fig. 1;

Fig. 3 is a vertical section through the operating means of the headlight, certain parts being in full lines; and Fig. 4 is a diagram of the circuit connections.

The headlights 1 are of the usual, or any desired construction but instead of being rigidly fastened such as prevails with headlights as commonly used, they are carried by stems 2 which are suitably mounted for turning so that the headlights may be deflected to bring their faces or lenses into an angular position and to throw the beams of light to the right of the road or street.

Secured to the stems 2 are crank arms 3 which are cross connected by a link 4 so that they will swing in unison. One of the crank arms 3 extends out on both sides of the stem 2 for operation or actuation by the armatures 4 and 5 which are under the control of the solenoids 6, 7, respectively. The armatures are pivotally connected to the crank arm 3 at 8. The solenoids are pivotally mounted at 9 on the shell or casing 10 so that they may swing.

The headlights are supported by fixed stems 11 which rise from suitable brackets, not shown, carried by the automobile, said stems being surmounted by plates 12 which are connected thereto. Between the plates 12 and the cranks 3 there are interposed ball bearings 13. The headlights being rotatable on the ball bearings 13, they may be turned with very little friction resulting and hence but little current is required to operate them.

The double crank 3 is limited to swing through a small angle, say ten or fifteen degrees, by stops or abutments 14 rising from the plate 12.

Mounted by bracket 15 on crank 3, is a solenoid 16 whose armature is arranged to drop into a hole 17 in the arm 3 and to have its lower end enter a hole or socket 18 in the plate 12 when the headlights are in their normal position, or to enter a corresponding hole in the plate 12 when the headlights are in their deflected position. The purpose is to lock the double crank arm 3 in each of its two positions so that the headlights will remain where they have been pulled by the respective solenoids 6, 7.

Referring to Fig. 4, the solenoids are controlled as follows: There is a common return circuit 19 leading to battery 20 from all of the solenoids. The solenoid 6 has its own circuit 21; solenoid 7 has its circuit 22; solenoid 16 has its own circuit 23. Switches 24, 25, 26, control the circuits of solenoids 6, 15 and 7, respectively.

When it becomes necessary to deflect the headlights so that a driver coming from the opposite direction will not be blinded by the glare, the driver of the car having our invention, presses the switch 25 which causes energization of the solenoid 16; thereupon, the locking armature is drawn upwardly out of the hole or socket 18, thus unlocking the double crank 3. While still pressing the switch 25, the operator presses switch 26. Thereupon, the solenoid 7 is energized and immediately draws in its armature 5, pulling the double crank 3 to the right and turning the headlights in that direction. The switch 25 having been released by the driver, the solenoid 16 is deenergized by the breaking of its circuit, whereupon the armature drops into the other hole 18, thus locking the double crank 3 in the position shown in Fig. 2. The headlights will remain in their deflected position until the driver again presses the switch 25 and follows this operation by pressing the switch 24. When he does this, the solenoid 16 again retracts its armature and unlocks the double crank 3 and thereafter the solenoid 6 draws in its armature 4 and swings the crank 3 back to normal position. The release of the switch 25 enables the armature to drop into the hole 18 to lock the headlights in their normal, straight-ahead position.

The lower end of the armature may be tapered to facilitate its entry into, and removal from, the holes, if desired a spring may be used in connection with the armature 16 to expedite its downward movement, but gravity alone will usually be sufficient.

Our invention is not limited to any kind of switch but it is preferable to have push-button switches which will automatically open when released. Our invention is not limited to the precise electromagnetic means described and disclosed as it is possible to operate the headlights by other electromagnetic means than those set forth. However, the electromagnetically controlled lock for holding the headlights in their position, as determined by the driver, is of importance in our invention although we do not limit the invention to the specific means used to effect locking.

What we claim is:

1. The combination with swingingly mounted headlights of rigidly cross-connected movably mounted members respectively cooperating therewith, said members being adapted to move only a predetermined distance for the purpose of swinging the headlights in one direction or the other to one or the other of two predetermined positions, an electromagnet and armature for moving said members in one direction only, and the headlights to one of said positions, and an independent electromagnet and armature for moving said member in the opposite direction only to the other of said positions, said electromagnets being capable of independent energization, and an electro-magnetically operated latch which automatically locks said last named member in each of its two positions, that is, with the headlight in normal, or in completely deflected, position.

2. In an electrically operated and controlled set of headlights, the combination with crank arms respectively coupled to the headlights and themselves having a rapid cross rod connection adapting them to move in unison, of independent solenoids, independent armatures for the respective solenoids which are pivoted to the same crank arm and are arranged, respectively, to operate the said crank arm in opposite directions under the influence of their solenoids, circuit connections and switches for the respective solenoids whereby either one of them may be selectively energized, a solenoid additional to the foregoing solenoids, a circuit and switch for the last named solenoid, and an armature for said last named solenoid which is adapted to lock the crank arms either in normal or in deflected position and is subject to the control of the said last named solenoid.

In testimony whereof we affix our signatures.

CHARLES ELLIS BLACKBURN, Sr.
JOHN RAPHAEL CAMBRON, Sr.